Aug. 1, 1972 — P. H. JOHNSON — 3,681,031
CARBON BLACK REACTOR
Filed June 5, 1969

INVENTOR.
P. H. JOHNSON
BY
ATTORNEYS

United States Patent Office 3,681,031
Patented Aug. 1, 1972

3,681,031
CARBON BLACK REACTOR
Paul H. Johnson, Bartlesville, Okla., assignor to
Phillips Petroleum Company
Filed June 5, 1969, Ser. No. 830,611
Int. Cl. C09c 1/48
U.S. Cl. 23—259.5     3 Claims

ABSTRACT OF THE DISCLOSURE

A method and apparatus for introducing combustion gases into a carbon black furnace, the method involving the introduction of the combustion gases at variable velocities to affect the extent of the interaction between the axially-introduced reactants and the combustion gases. The apparatus includes means for varying the introduction velocity of the combustion gases.

---

Figure 1:
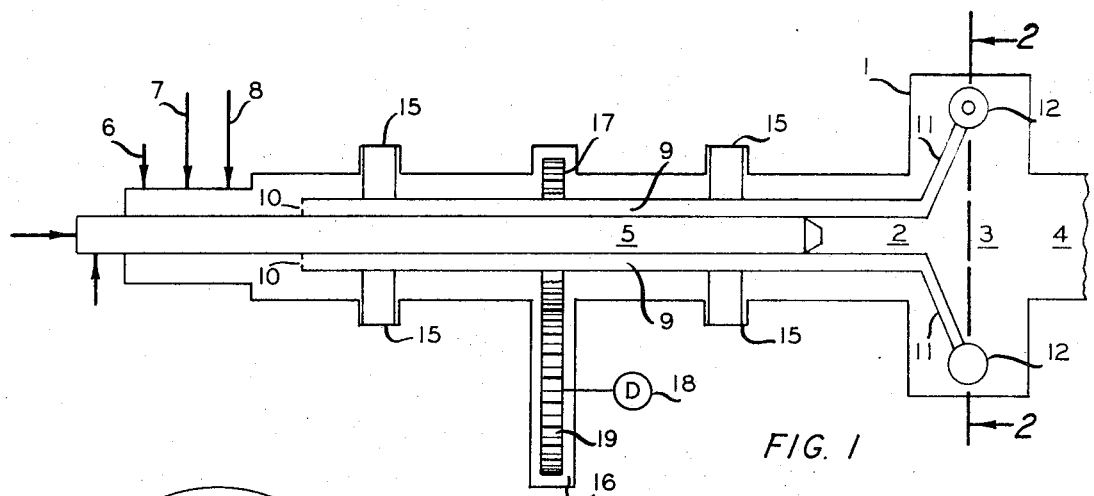

This invention pertains to a method and to apparatus for producing carbon black.

In one of its more specific aspects, this invention pertains to carbon black production from a plurality of individually-introduced reactant streams.

Many types of carbon black reactors are conventionally employed. In one of the more widely used reactors, known as the precombustion or combustion type reactor, there exists a combustion zone from which reactants are introduced through the periphery of the path of the axial flow through reactor. Generally, combustion gases are introduced into the reactor from this combustion zone to form a reactant mass with those reactants introduced axially directly into the combustion zone or from an axial zone preceding the combustion zone.

The diameter of this combustion chamber is generally considerably larger than that of the axial path through it. While radial introduction of the reactants through the combustion zone into the axial path can be made, generally introduction is made tangential to the axial path. Due to the conventional circular configuration of the combustion zone, tangential introduction of the gases causes them to encircle the axial flow, and to establish themselves as a mass rotating peripheral to the axial mass. Eventually these gases assume a helical-patterned flow through the reactor in relation to the axial flowing mass of reactants. Accordingly, interaction between the axially-introduced reactants and those introduced through the combustion zone is primarily limited to the boundary layer between them, and interaction between these masses becomes a function of the disturbance effected within this boundary layer. Therefore, the rotational velocity of that mass of gases introduced from the combustion zone has an effect on this interaction and, resultingly, on the quality of the carbon black produced.

While this rotational velocity is affected by the quantities of the reactants introduced axially and from the combustion zone, the velocity of entry from the combustion zone, and other factors, there has now been developed a reactor which permits control of this rotational velocity. The apparatus of this invention provides such a reactor.

According to the apparatus of this invention, there is provided a carbon black reactor comprising a plurality of zones in axial, contiguous alignment, at least one of said zones being adapted for introduction therethrough of some portion of reactants peripheral to the longitudinal axis of the reactor, and means being provided conjunctive with said zone for varying the peripheral speed of the reactants introduced therefrom.

According to the method of this invention, there is provided a process for producing carbon black in which combustion gases are introduced peripheral to the axial flow through the reactor to form a reactant mass having an inner axial-flowing mass and an outer helical-flowing mass, and the reactant mass is passed through the reactor under such conditions as to form carbon black, the improvement comprising controlling the velocity of the helical-flowing mass to control the property of the carbon black product.

In one embodiment of this invention the reactor is provided with a single zone adapted for introduction of reactants peripheral to the longitudinal axis of the reactor, means being provided within that zone for varying the rotational speed of the reactants introduced therethrough.

In another embodiment of this invention, the reactor is adapted with a plurality of zones of differing diameters, each zone being adapted for introduction of reactants peripheral to the longitudinal axis of the reactor, means being provided for selecting that zone through which reactant introduction is made, the speed of the reactants introduced being related to the diameter of the zone selected.

Accordingly, it is an object of this invention to provide a novel carbon black reactor by means of which a wide variety of carbon blacks can be produced.

It is another object of this invention to provide a carbon black reactor by means of which carbon black of narrow specification ranges can be produced.

The apparatus of this invention is operable in any of the conventional carbon black-producing processes in which carbon black is produced by the pyrolytic decomposition of a hydrocarbon in the presence of an oxidant and a fuel, the fuel being introduced as an extraneous material or being derived from the hydrocarbon itself. Similarly, the apparatus of this invention can have any number of contiguous reaction zones into any of which any number of reactants are introduced. While the subsequent description of the apparatus of this invention is in terms of an axial type reactor in which the principal zones are the axial zone, the combustion zone, and the reaction zone, the apparatus of this invention also includes reactors in which the axial zone is not employed, or is nonexistent, and in which the principal portion of hydrocarbon is introduced into the combustion zone.

Figure 2:
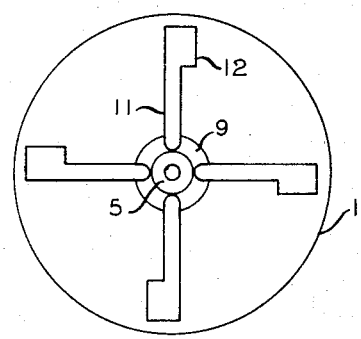
Figure 3:
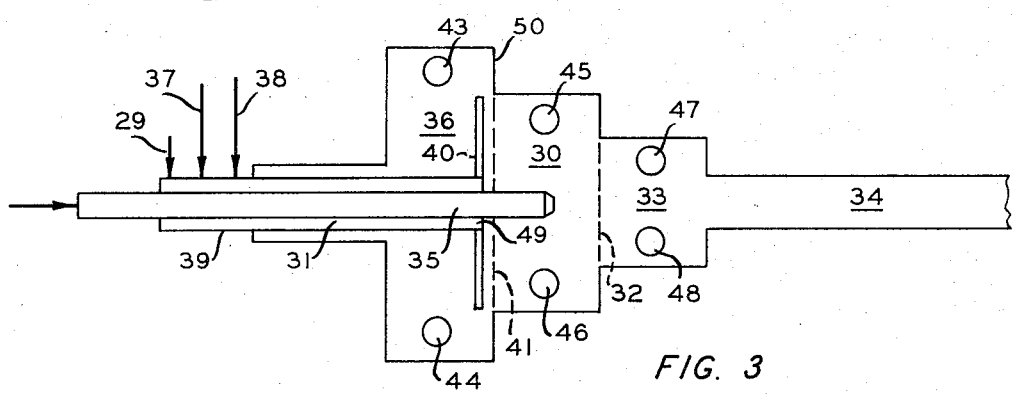
Figure 4:
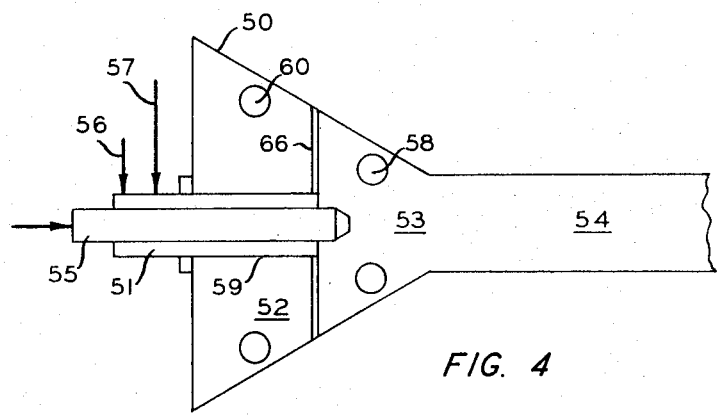

This invention will be more readily understood when explained in conjunction with the attached drawings in which FIG. 1 depicts one embodiment of this invention, showing an elevational view of the apparatus. FIG. 2 is a cross-sectional view of the apparatus of FIG. 1 taken along section 2—2 of FIG. 1. FIG. 3 depicts a second embodiment of this invention, showing a cross-sectional view of the apparatus in elevation. FIG. 4 is an elevational view of a third embodiment of this invention.

In all figures the internal configuration of the reaction zones is shown, omitting, for purposes of simplicity, the insulation external thereto and the external shell of the reactor, since these omitted features form no part of the invention.

Referring now to FIG. 1, there is shown the internal configuration of reactor 1 having axial zone 2, combustion zone 3, and reaction zone 4, the downstream portion of the reactor being omitted. Passage of reactants through the reactor is axially from zone 2 to zone 4. Combustion zone 3 has a greater diameter than that of zones 2 and 4 which may be of any suitable diameter in relation to each other.

Axial zone 2 is adapted with reactant inlet tube 5 through which any of the reactants may be introduced into zone 2. Adjustment of oil inlet tube 5 can be made by means of conventional slip joints to introduce reactants into zone 3.

Introduced into the upstream portion of axial zone 2 through conduits 6, 7, and 8 are reactants which may comprise any of those employed in carbon black production. Positioned, preferably in peripheral relationship to oil inlet tube 5, is conduit 9.

Conduit 9 is adapted at its upstream end with apertures 10 and at its downstream end with legs 11. It is supported along its length by a plurality of supports 15. It is affixed at a suitable point along its length to gear 17 which enmeshes with gear 19 driven by drive means 18.

Rotatable supports 15 act to support conduit 9 within axial zone 2 and to prevent passage of those reactants introduced through conduits 6, 7, and 8. Hence, the reactants introduced through conduits 6, 7, and 8 pass into conduit 9 through apertures 10 and along conduit 9 into legs 11 from which discharge is made through nozzles 12.

Any suitable number of legs 11 and discharge nozzles 12 can be employed. Nozzles 12 will be of any suitable configuration, adapted for the introduction of reactants into zone 3, either as such, or as a mixture of combustion gases produced by the combustion of a fuel with an oxidant at nozzles 12. Generally, all nozzles 12 will be positioned to discharge in the same direction and are positioned to discharge at any point beyond the diameter of axial zone 2, although such a point may lie on a diameter less than the diameter of reaction zone 4.

As mentioned, conduit 9 is adapted with a plurality of supports 15 and gear 17. Rotatable supports 15 allow conduit 9 to be rotated through drive means 18 and drive gear 19 enmeshing gear 17. Drive chamber 16 encloses the gears and prevents leakage of the reactants to the exterior of the reactor.

Conduit 9 is preferably a single conduit encircling inlet tube 5, with individual legs 11 branching out from conduit 9. However, a plurality of individual conduits 9, each with its leg 11, can be supplied in encircling relationship to inlet tube 5.

Accordingly, it will be seen that reactants introduced into conduit 9 pas through legs 11 and discharge through nozzle 12. As such, the reactants can have imparted to them suitable and variable velocities depending upon the speed of rotation imparted to nozzles 12 through drive 18.

FIG. 2 shows one concept of nozzles 12 although any suitable configuration may be employed.

Referring now to FIG. 3, there is shown one embodiment of the invention in which the apparatus consists of a plurality of combustion zones.

In FIG. 3, there is shown in elevation the internal configuration of reactor 50 having axial zone 31 and reaction zone 34. Interpositioned between these zones is a plurality of combustion zones 36, 30 and 33, each of a different diameter. While only three zones are shown, any number of zones can be employed. Similarly, while these zones are shown as decreasing in diameter in a direction from axial zone 31 to reaction zone 34, these combustion zones can have any desired diameter, with no regularity being required.

The reactor is adapted with oil tube 35 which can be positioned to discharge into axial zone 31 or into any of the various combustion zones. Axial zone is adapted by means of conduits 29, 37, and 38 for introduction of any of the various reactants peripheral to oil tube 35.

Each combustion zone is adapted with any suitable number of ports for the introduction of any of the reactants thereinto. Zone 36 is equipped with ports 43 and 44, zone 30 is equipped with ports 45 and 46, and zone 33 is equipped with ports 47 and 48. These ports are comparable to those of reactors having a single combustion zone and can be employed to introduce reactants or the products of combustion from the oxidation of fuel with an oxidant.

Extending exteriorly from axial zone 31, and slidably adjustable into the reactor from the exterior of the reactor, by means of conventional slip joints, is shaft 39. Affixed to its internal end is plate 40 which is of a configuration congruent with the configuration of the zone 30. As such, plate 40 is movably positionable at any location from the upstream wall of combustion zone 36 to that imaginary line 32 separating zone 30 from zone 33. It is further positionable such that oil inlet tube 35 is extendable through shaft 39 and through opening 49 around tube 35 to discharge downstream of the locus at which plate 40 is positioned.

When plate 40 is positioned at the upstream wall of combustion zone 36, introduction of reactants can be made through any of the ports of any of the combustion zones.

Plate 40 can be similarly positioned at imaginary line 41 between zones 36 and 30 as well as at imaginary line 32 between zones 30 and 33. In either instance, the reactant introduction can be made through one or more of those ports downstream of the plate, introduction of reactants through ports upstream of the plate being largely obstructed from entering the downstream portion of the reactor by plate 40. In any instance, introduction of reactants can be made through all the ports downstream of the position of the plate 40. In all instances, the quantity of the reactants introduced is largely determinative of the velocity with which the reactants encircle the axial flow. If a single set of ports is used, the diameter of the zone employed will be largely determinative of the velocity imparted to the gases encircling the axial flow.

In respect to the size of the various combustion zones, it is only desirable that the smallest of the combustion zones be greater in diameter than the diameter of the axial flow path therethrough through the reactor. Opening 49 can be of any desired size.

It will be appreciated that a reactor comprising more than three combustion zones and a plurality of shafts 39, each carrying a different size plate 40 can be employed. In this instance, each shaft 39 is adapted for adjustment from the exterior of the reactor, and each plate 40 is of such size as to conform to the requirements of restricting flow from the zones upstream of its positioning.

If but two combustion zones are employed, a single plate can be used in a reactor comparable to the configuration shown in FIG. 4.

In FIG. 4, reactor 50 is comprised of axially contiguous zones 51, 52, 53 and 54.

Axial zone 51 is adapted with adjustable nozzle 55 through which reactants can be introduced. It is also adapted with conduits 56 and 57 for the introduction of reactants. Plate 66 on rod 59 is adjustable from upstream wall of zone 52 to a position between zones 52 and 53.

Zone 52 is provided with ports 60 and zone 53 is provided with ports 58 for the introduction of reactants. Positioning of plate 66 and nozzle 55, with reactants being introduced through conduits 56 and 57 around nozzle 55, allows all reactants to be introduced into either zone 52 or zone 53 with the result that the velocity of the reactants forming the mass circumferential to the axially-introduced reactants can be selected.

Exemplary of the effect of the velocity of the circumferentially-introduced reactants are the following runs made in a reactor having the general configuration of that of FIG. 1.

The axial reactor employed had three zones through which reactants could be introduced circumferentially to those reactants introduced through the axial zone. In each instance the axial introduction of reactants was made into the zone into which the circumferentially-introduced reactants entered the reactor. Similarly, flow in all zones upstream of the circumferential zone employed was avoided. In all instances the same conditions of make-oil composition, reactant rates and other pertinent variables were maintained. The only significant operational difference was that in each run the point of quench introduction into the final zone was regulated in order to produce blacks of comparable photolometer value.

Such adjustment, however, would have no significant effect upon the properties of structure and surface area as otherwise influenced by the circumferential velocity of the reactants.

Results were as follows:

| Circumferential zone diameter | Relative speed of rotation | Carbon black structure, DBP |
|---|---|---|
| 37" | 1.0 | 120 |
| 30" | 1.23 | 110 |
| 24" | 1.54 | 92 |

These data indicate the operability of the method and apparatus of the subject invention. They also indicate that with a single reactor having a series of zones of differing diameters, a wide range of carbon blacks can be manufactured.

It will be evident from the foregoing that various modifications can be made to both the process and the apparatus of this invention. However, it is considered that such modifications are within the scope of the art.

What is claimed is:

1. A carbon black reactor comprising axially contiguous sections, said sections comprising an upstream section, a downstream section and a carbon black outlet section, said upstream section having a diameter greater than the diameter of said downstream section, said upstream section and said downstream section each being adapted with conduit means for introduction of reactants through the circumferential periphery of said sections to establish a flow of reactants helically to the longitudinal axis of said reactor, said outlet section being adapted with conduit means for the recovery of carbon black therefrom, a plate movably positionable between said upstream and downstream sections and extending substantially across one of said sections to substantially obstruct flow between said upstream section and said downstream section, and hydrocarbon feed conduit means axially positionable to discharge downstream of said plate.

2. The reactor of claim 1 in which said plate is positionable perpendicularly to the longitudinal axis of said reactor, said plate being affixed to a conduit extending along the axis of said reactor, said conduit being adapted for the discharge of hydrocarbon feed downstream of said plate.

3. The reactor of claim 1 in which said diameter of said plate is substantially equal to the diameter of the inlet to said downstream section.

References Cited
UNITED STATES PATENTS

| | | | |
|---|---|---|---|
| 3,301,639 | 1/1967 | De Land | 23—209.4 |
| 3,318,664 | 5/1967 | Latham et al. | 23—209.4 |
| 3,355,247 | 11/1967 | Krejci et al. | 23—209.4 |
| 3,477,816 | 11/1969 | Shepherd | 23—209.4 |
| 3,490,869 | 1/1970 | Heller | 23—209.4 |
| 1,892,559 | 12/1932 | Hillhouse | 48—223 UX |
| 2,220,066 | 11/1940 | Cornell, Jr. | 261—83 X |
| 2,560,866 | 7/1951 | Hoogendam | 239—214.11 |
| 2,984,296 | 5/1961 | Voorheis | 431—187 |
| 3,098,883 | 7/1963 | Heuse et al. | 23—277 R |
| 3,522,005 | 7/1970 | Braddock | 23—209.4 |

JAMES H. TAYMAN, JR., Primary Examiner

U.S. Cl. X.R.

23—209.4, 277 R; 431—187, 188